US012640147B2

(12) United States Patent
Mohamed

(10) Patent No.: US 12,640,147 B2
(45) Date of Patent: May 26, 2026

(54) METHOD AND APPARATUS FOR LANGUAGE DETECTION BASED VOICE REAL-TIME TRANSLATION AS A SERVICE IN TELECOM

(71) Applicant: RAKUTEN MOBILE, INC., Tokyo (JP)

(72) Inventor: Ahmed Mohamed Gamal Abdelaziz Mohamed, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 476 days.

(21) Appl. No.: 18/016,599

(22) PCT Filed: Nov. 29, 2022

(86) PCT No.: PCT/US2022/051179
§ 371 (c)(1),
(2) Date: Jan. 17, 2023

(87) PCT Pub. No.: WO2024/118051
PCT Pub. Date: Jun. 6, 2024

(65) Prior Publication Data
US 2024/0257806 A1 Aug. 1, 2024

(51) Int. Cl.
*G10L 15/22* (2006.01)
(52) U.S. Cl.
CPC .................................. *G10L 15/22* (2013.01)
(58) Field of Classification Search
CPC ..... G10L 15/22; G10L 13/033; G10L 15/005; H04M 2250/58; H04M 1/72403; H04M 3/42; G06F 40/58
See application file for complete search history.

(56) References Cited

U.S. PATENT DOCUMENTS

| | | | |
|---|---|---|---|
| 9,710,464 B1 * | 7/2017 | Undavalli | ........... G10L 19/0018 |
| 2007/0155346 A1 * | 7/2007 | Mijatovic | ............. H04W 84/08 |
| | | | 455/90.2 |
| 2009/0234635 A1 * | 9/2009 | Bhatt | ...................... G06F 40/58 |
| | | | 704/235 |

(Continued)

OTHER PUBLICATIONS

International Search Report dated Mar. 8, 2023, issued in International Application No. PCT/US2022/051179.

(Continued)

*Primary Examiner* — Mark Villena

(74) *Attorney, Agent, or Firm* — Sughrue Mion, PLLC

(57) ABSTRACT

A method performed in a processor of a network node includes receiving at least one data packet associated with a voice call, the at least one data packet including (i) header information that specifies a source address and a destination address and (ii) voice data. The method further includes, in response to determining the at least one data packet is associated with a subscriber of a translation service performed in the network node, performing the translation service including: (i) detecting a first language of the voice data of the at least one data packet; (ii) translating the voice data to a second language specified by the subscriber in response to a determination the second language is different than the first language; and (iii) transmitting the at least one data packet with the translated voice data to the destination address.

18 Claims, 8 Drawing Sheets

(56)　　　　　References Cited

U.S. PATENT DOCUMENTS

| | | | |
|---|---|---|---|
| 2010/0299150 A1* | 11/2010 | Fein | G06F 40/58 |
| | | | 704/277 |
| 2018/0089172 A1* | 3/2018 | Needham | H04L 67/306 |
| 2019/0108492 A1 | 4/2019 | Nelson et al. | |
| 2019/0138605 A1* | 5/2019 | Black | G06F 40/58 |
| 2019/0273767 A1* | 9/2019 | Nelson | H04M 7/0027 |
| 2020/0043481 A1* | 2/2020 | Xiong | G10L 15/005 |
| 2020/0193971 A1* | 6/2020 | Feinauer | G10L 15/075 |
| 2022/0201456 A1* | 6/2022 | Chiang | H04L 12/1813 |
| 2022/0345931 A1 | 10/2022 | Svennebring et al. | |

OTHER PUBLICATIONS

Written Opinion dated Mar. 8, 2023, issued in International Application No. PCT/US2022/051179.

* cited by examiner

METHOD AND APPARATUS FOR LANGUAGE DETECTION BASED VOICE REAL-TIME TRANSLATION AS A SERVICE IN TELECOM

CROSS REFERENCE TO RELATED APPLICATIONS

This application is a National Stage of International Application No. PCT/US2022/051179 filed Nov. 29, 2022.

TECHNICAL FIELD

The present disclosure relates generally to communication systems, and more particularly to methods and apparatuses for language detection and translation in the telecom domain.

BACKGROUND

Voice translation services play an important role when traveling internationally and communicating with people who don't speak your native language. Voice translation services may be provided as a standalone application downloaded by a mobile device. Voice translation may also be provided with Rich Communication Services (RCS) or IP multimedia subsystem (IMS) based voice calls.

However, these applications and services are disadvantageous in a number of respects. First, these applications and services struggle with providing reliable real time translation, often hindering communications between parties. Second, since these applications and services are not provided in the telecom domain, these applications and services do not have the benefit of high quality security protocols applied to voice calls in the telecom domain during the translation process. Third, these applications and services require a user to set the language of translation for every call. Fourth, these applications and services are dependent on the handset as well additional applications run by the handset (e.g., operating system), thereby limiting the use of these applications and services. Fifth, since these applications and services are not provided in the telecom domain, these applications and services are not provided a guaranteed bit rate and therefore, are very sensitive to noise and corruption.

Improvements are presented herein. These improvements may also be applicable to other multi-access technologies and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for language detection and translation in the telecom domain are disclosed by the present disclosure.

According to an exemplary embodiment, method performed in a processor of a network node includes receiving at least one data packet associated with a voice call, the at least one data packet including (i) header information that specifies a source address and a destination address and (ii) voice data. The method further includes, in response to determining the at least one data packet is associated with a subscriber of a translation service performed in the network node, performing the translation service including: (i) detecting a first language of the voice data of the at least one data packet; (ii) translating the voice data to a second language specified by the subscriber in response to a determination the second language is different than the first language; and (iii) transmitting the at least one data packet with the translated voice data to the destination address.

According to an exemplary embodiment, a network node includes at least one memory configured to store computer program code, and at least one processor configured to access said at least one memory and operate as instructed by the computer program code. The computer program code includes receiving code configured to cause at least one of said at least one processor to receive at least one data packet associated with a voice call, the at least one data packet including (i) header information that specifies a source address and a destination address and (ii) voice data. The computer program code includes performing code configured to cause at least one of said at least one processor to, in response to determining the at least one data packet is associated with a subscriber of a translation service performed in the network node, perform the translation service including: (i) detecting a first language of the voice data of the at least one data packet; (ii) translating the voice data to a second language specified by the subscriber in response to a determination the second language is different than the first language; and (iii) transmitting the at least one data packet with the translated voice data to the destination address.

According to an exemplary embodiment, a non-transitory computer readable medium having instructions stored therein, which when executed by a processor in a network node cause the processor to execute a method includes receiving at least one data packet associated with a voice call, the at least one data packet including (i) header information that specifies a source address and a destination address and (ii) voice data. The method further includes, in response to determining the at least one data packet is associated with a subscriber of a translation service performed in the network node, performing the translation service including: (i) detecting a first language of the voice data of the at least one data packet; (ii) translating the voice data to a second language specified by the subscriber in response to a determination the second language is different than the first language; and (iii) transmitting the at least one data packet with the translated voice data to the destination address.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

Figure 1:
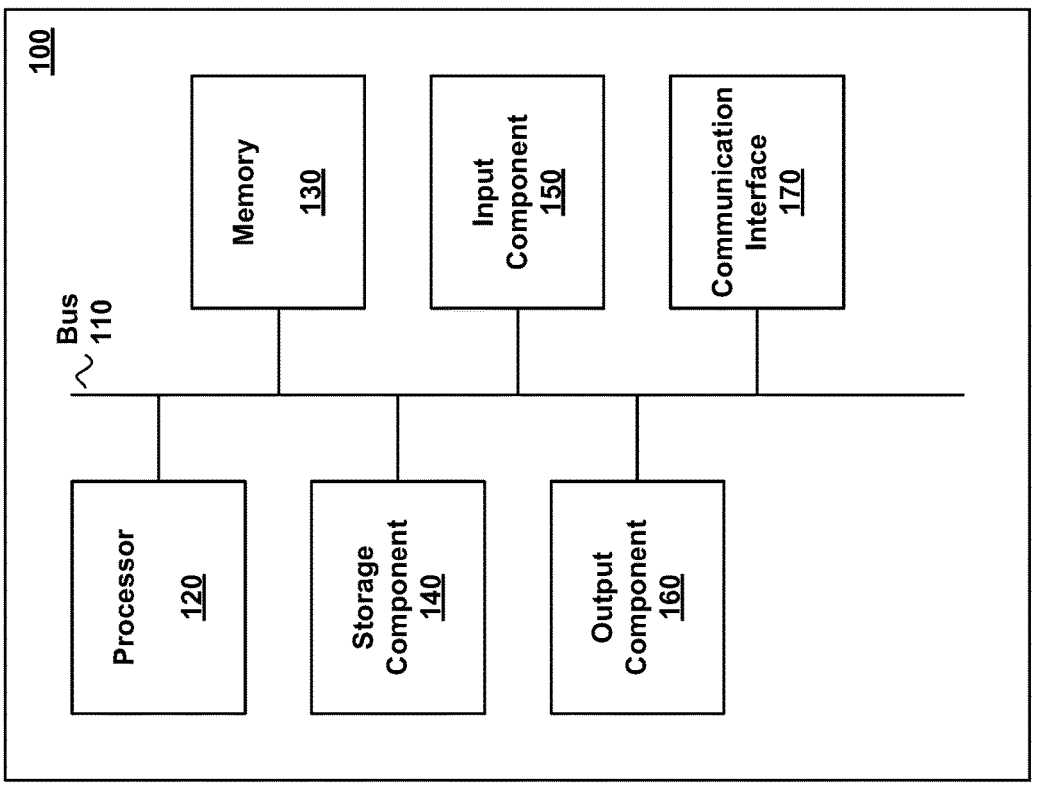
FIG. 1 is a diagram of an example network device in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms.

Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Embodiments of the present disclosure are directed to language detection and translation in the telecom domain. In some embodiments, a microservice based voice translation service is provided by a telecommunication service provider as a subscription. For example, the telecommunication service provider may provide the translation service as part of a roaming services bundle or as part of a business bundle that will help both businesses and an end user to logistically solve language barrier issues. As an example, the translation service may be used for booking a hotel, restaurant, or a cab in a foreign country. The translation service may be used for business purposes (e.g., business deal calls, conference meetings) to upscale the telecom service provider's roaming services to the end user. According to some embodiments, the translation services may be subscribed by a user through self-enrollment or customer support enrollment with listing the language of choice (e.g., user specifies the preferred language for receiving voice calls). The translation service may help a call center scale up and handle customers of inbound roaming without the need of hiring a scale to cover many languages.

In some embodiments, the translation service may be based on trained voice translation models that allow detection of a language, decoding-transformation of a voice data packet, and translation of real time voice RTP streams internally on a core network node. After the translation is performed, the headers may be reinserted in the voice data packet with the translated voice data and sent to a destination specified in the voice data packet.

According to some embodiments, when a call is initiated with the translation service activated, the first packets within the voice call may go through initialization of B-side and A-side voice characteristics and language detection. For example, an A side UE may initiate a voice call with a B side UE. If the A side UE is the subscriber of the translation service, the user of the A side UE may set a preferred language during subscription. When the call is initiated and the user on the B side UE starts speaking, the core side network node may perform an initialization process by determining voice characteristics and detecting the language of the B side UE user based on the first few received voice data packets from the B side UE. The voice characteristics may correspond to the speaking voice of the B side UE user. Accordingly, when the language of the B side UE user is detected, and the voice data in the voice data packet is translated, the translated voice data corresponds to or is substantially similar to the voice of the B side UE user.

In some embodiments, the subscriber may issue a command that starts the translation service along with parameters to use for the languages on both directions of a voice call. For example, the subscriber may issue one or more verbal commands that start the translation service and specify one or more parameters for the translation service.

According to some embodiments, the translation service leverages network data analytics functions (NWDAF) into the ML/Analytics and communication to a media processor in IMS. As an example, the NWDAF can chose the model parameter settings and instruct the translation service on which parameters to use for the voice call/stream. The translation service may be implemented in Voice over long term evolution (Volte)/Voice over new Radio (VoNR)-native dialer and Rich Communication (RCS) on an Over the Top Communications (OTT) application. Furthermore, the translation service may be handset independent since the translation service is performed on a core network side. Additionally, the translation service does not have a dependency on the B-side/B network. For example, while the A side UE may initiate a VoIP call, the B-side/B network may be a public land mobile network.

According to some embodiments, the translation service uses Secure RTP (SRTP) and user data over the air encryption. The translation service may perform auto detection of the language while enabling seamless communication between A and B-Side without any special settings. The translation service may be compatible with a native dialer of a UE or RCS core related services without dependency on the handset or other application. The translation service may further leverage IMS and handset noise cancellation, speech acceleration, and volume relate features that improve voice quality while assuring the translation is clear.

In some embodiments, the translation service may be used to leave a voice mail or voice note. For example, when the A side UE user initiates a voice call that is not picked up by the B side, the A side UE user may leave a voice mail that is translated with the voice characteristics of the A side UE user and stored in a voice mail inbox of the B side UE user. Furthermore, the translated speech may be converted to text and left as a note with the B side UE user.

FIG. 1 is diagram of an example device for performing translation services. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar functioning device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may be included in the core network 240 and perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Figure 2:
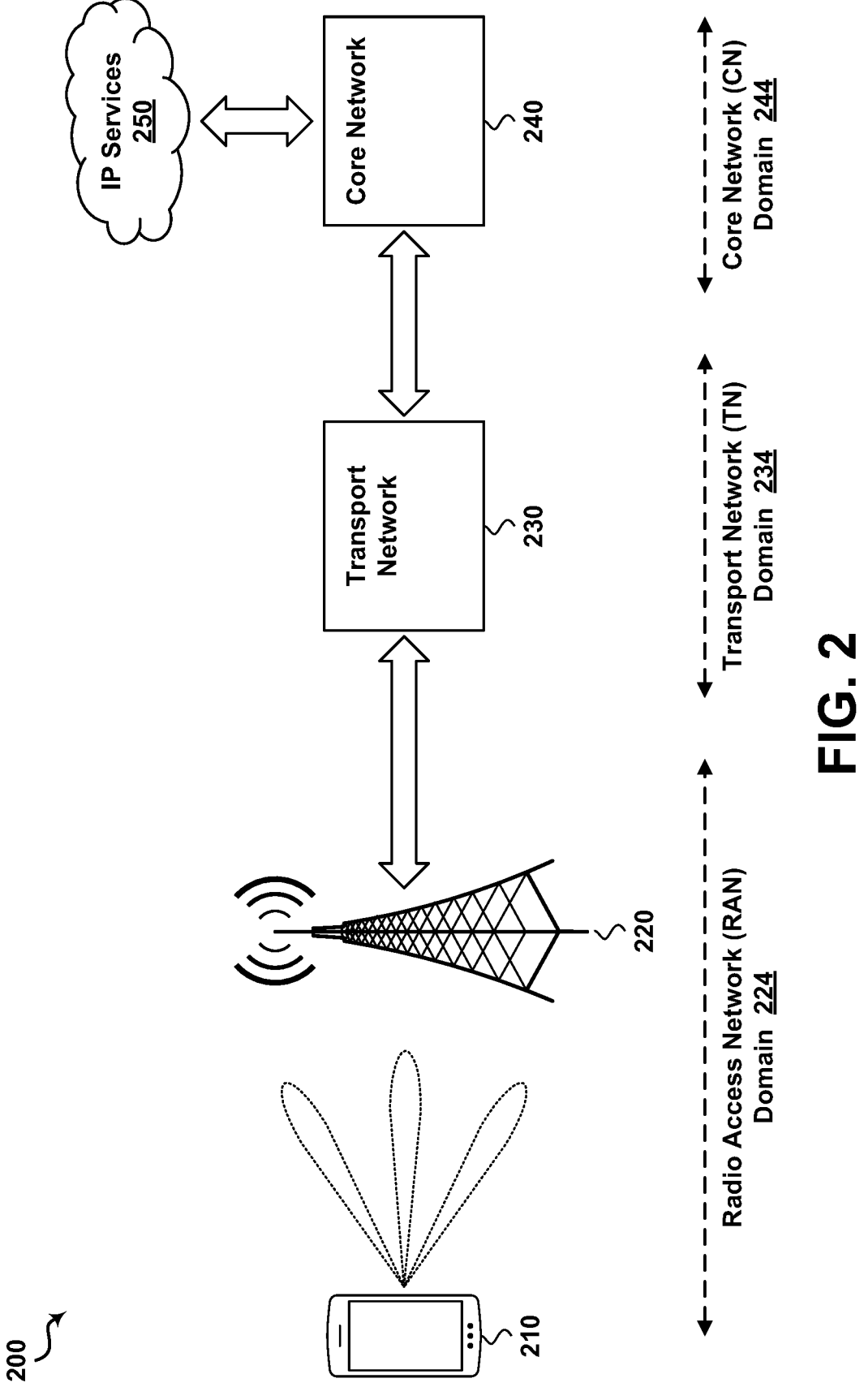
FIG. 2 is a schematic diagram of an example wireless communications system, in accordance with various embodiments of the present disclosure.

FIG. 2 is a diagram illustrating an example of a wireless communications system, according to various embodiments of the present disclosure. The wireless communications system 200 (which may also be referred to as a wireless wide area network (WWAN)) may include one or more user equipment (UE) 210, one or more base stations 220, at least one transport network 230, and at least one core network 240. The device 100 (FIG. 1) may be incorporated in the UE 210 or the base station 220.

The one or more UEs 210 may access the at least one core network 240 and/or IP services 250 via a connection to the one or more base stations 220 over a RAN domain 224 and through the at least one transport network 230. Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IoT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 220 may wirelessly communicate with the one or more UEs 210 over the RAN domain 224. Each base station of the one or more base stations 220 may provide communication coverage to one or more UEs 210 located within a geographic coverage area of that base station 220. In some embodiments, as shown in FIG. 2, the base station 220 may transmit one or more beamformed signals to the one or more UEs 210 in one or more transmit directions. The one or more UEs 210 may receive the beamformed signals from the base station 220 in one or more receive directions. Alternatively or additionally, the one or more UEs 210 may transmit beamformed signals to the base station 220 in one or more transmit directions. The base station 220 may receive the beamformed signals from the one or more UEs 210 in one or more receive directions.

The one or more base stations 220 may include macrocells (e.g., high power cellular base stations) and/or small cells (e.g., low power cellular base stations). The small cells may include femtocells, picocells, and microcells. A base station 220, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

The one or more base stations 220 may be configured to interface (e.g., establish connections, transfer data, and the like) with the at least one core network 240 through at least one transport network 230. In addition to other functions, the one or more base stations 220 may perform one or more of the following functions: transfer of data received from the one or more UEs 210 (e.g., uplink data) to the at least one core network 240 via the at least one transport network 230, transfer of data received from the at least one core network 240 (e.g., downlink data) via the at least one transport network 230 to the one or more UEs 210.

The transport network 230 may transfer data (e.g., uplink data, downlink data) and/or signaling between the RAN domain 224 and the CN domain 244. For example, the transport network 230 may provide one or more backhaul links between the one or more base stations 220 and the at least one core network 240. The backhaul links may be wired or wireless.

The core network 240 may be configured to provide one or more services (e.g., enhanced mobile broadband (eMBB), ultra-reliable low-latency communications (URLLC), and massive machine type communications (mMTC), etc.) to the one or more UEs 210 connected to the RAN domain 224 via the TN domain 234. As an example, the core network 240 performs the translation service. Alternatively or additionally, the core network 240 may serve as an entry point for the IP services 250. The IP services 250 may include the Internet, an intranet, an IP multimedia subsystem (IMS), a streaming service (e.g., video, audio, gaming, etc.), and/or other IP services.

Figure 3:
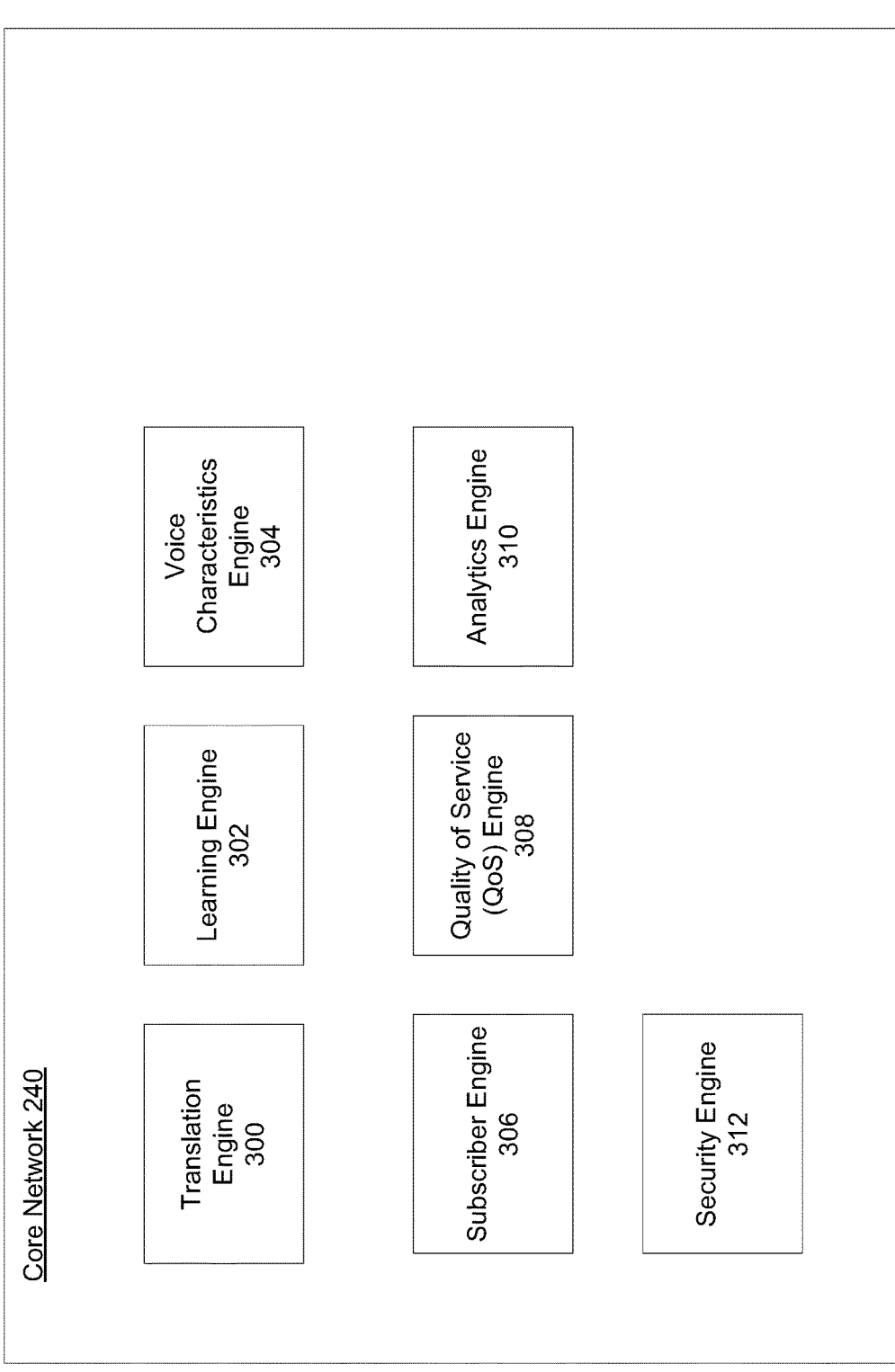
FIG. 3 is a schematic diagram of an example architecture of a core network node, in accordance with various embodiments of the present disclosure.

FIG. 3 illustrates an example architecture of the core network node 240. In some embodiments that core network node 240 includes a translation engine 300, a learning engine 302, a voice characteristics engine 304, a subscriber engine 306, a quality of service engine 308, an analytics engine 310, and a security engine 312.

The translation engine 300 may be configured to detect a language of voice data included in a voice data packet and translate the voice data to a preferred language. For example, during an initialization process, the translation engine 300 may analyze voice data included in voice data packets to detect a language. The detection of the language may be based on any known language detection model stored in the learning engine 302. Upon detection of the language, the translation engine 300 may load any known language translation model from the learning engine 302. For example, if the translation engine 300 detects the Spanish language, the translation engine 300 may load the appropriate translation models from the learning engine for translating Spanish to a preferred language designated by a subscriber (e.g., Spanish to English).

The learning engine 302 may use models for training the translation engine 300 to perform language translation on the voice data. For example, the models stored in the learning engine 302 may evolve with a state of art feedback cycle as the models mature to handle Multi Languages background voices. The models may be updated based on data collected on the voice calls that are conducted through the core network.

The voice characteristics engine 304 may be configured to detect the voice characteristics of a voice included in voice data. For example, based on the detected voice characteristics, the voice in the translated voice data corresponds to the voice of the source speech. In some embodiments, the translation engine 300, learning engine 302, and voice characteristics engine 304 utilize the Common Voice-based Speech-to-Speech (CVSS) translation corpus. CVSS may be derived from the Common Voice corpus and speech-to-text translation (ST) corpus, by synthesizing the translation text into speech using state of the art text-to-speech (TTS) systems. CVSS provides translations in a natural speaking voice corresponding to the voice of the source speech.

As an example, CVSS includes sentence-level speech-to-speech translation pairs from at least 21 languages into English. CVSS may be directly used for training direct speech-to-speech translation (S2ST) models without any extra processing. CVSS may be directly derived from the CoVoST 2 speech-to-text (ST) translation corpus, which may be further derived from the Common Voice speech corpus. Common Voice includes a massively multilingual transcribed speech corpus designed for automatic speech recognition (ASR) in which the speech is collected by contributors reading text content from a large database such as Wikipedia and other text corpora. CoVoST 2 further provides professional text translation for the original transcript from at least 21 languages into English and from English into at least 15 languages.

In some embodiments, two versions of translation speech in English may be provided in CVSS, both of which are synthesized using state-of-the-art TTS systems, with each version providing unique value that doesn't exist in other public S2ST corpora. In the first version (CVSS-C), all the translation speech may be in a single canonical speaker's voice. Despite being synthetic, the speech is highly natural in speaking style. These properties ease the modeling of the target speech and enable trained models to produce high quality translation speech suitable for general user-facing applications. CVSS-C may be used where speech quality is of higher importance than accurately reproducing the speakers' voices.

In the second version (CVSS-T), the translation speech captures the voice from the corresponding source speech. Each S2ST pair has a similar voice on the two sides, despite being in different languages. Therefore, the dataset is suitable for building models where accurate voice preservation is desired, such as for movie dubbing, for example.

The subscriber engine 306 may provide a user interface that enables a customer of a cellular service to the translation service. Furthermore, the subscriber engine 306 may provide an automated signup service via a call to the customer with automated prompts for signing up for the translation service.

The Quality of Service (QoS) service engine 308 may be configured to allocate resources to guarantee bit rates and/or bandwidth to a voice call. For example, the QoS service engine 308 may give higher priority to voice data packets associated with a voice call. The analytics engine 310 may be configured to analyze the voice data included in a voice data packet and enhance the voice data. The security engine 312 may be configured apply security protocols to a voice call. For example, the security engine 312 may be configured to encrypt voice data packets in accordance with a security protocol.

Figure 4:
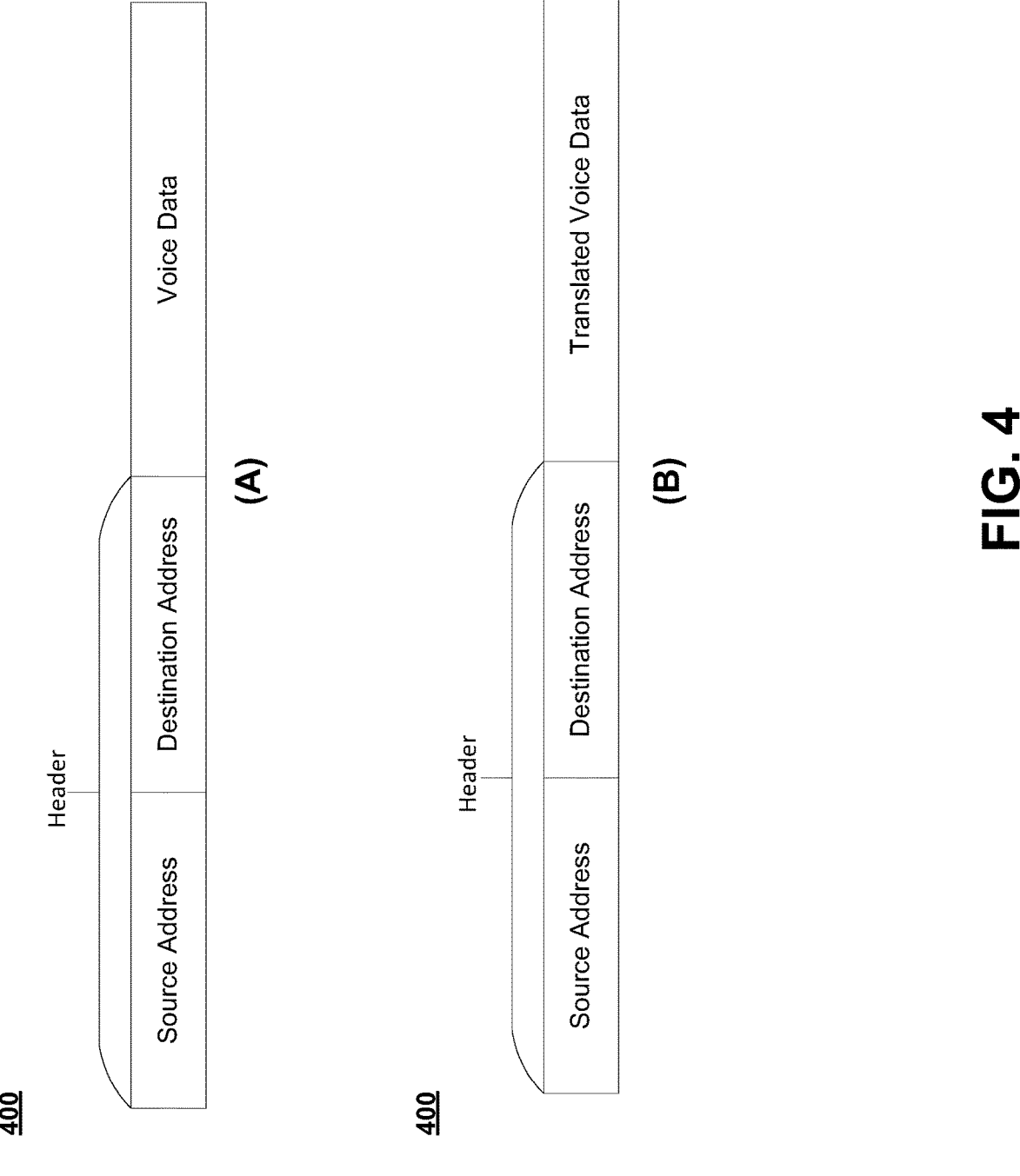
FIGS. 4A and 4B illustrate example voice data packets, in accordance with various embodiments of the present disclosure

FIGS. 4(A) and (B) illustrate an embodiment of a voice data packet 400. For example, the voice data packet may include a header that specifies a source address and a destination address. The voice data packet 400 further includes voice data corresponding to an audio portion (e.g., speech) of a voice call. The voice data packet illustrated in FIG. 4A may correspond to a packet received at the core network 240 before translation. The voice data packet 400 in FIG. 4A may be encrypted when received at the core network 240. Therefore, the core network 240 may decrypt the voice data packet 400, and decode the decrypted voice data packet 400 to extract and analyze the voice data. The analysis of the voice data may include a detection of a language as well as analysis of voice characteristics. The voice data may be translated from the detected language to a preferred language (e.g., from Spanish to English), and in accordance with the analyzed voice characteristics (e.g., translation may correspond to original speaking voice). After the translation is performed, the translated voice data may be encapsulated in the voice data packet 400 with the header (FIG. 4(B)), encoded, and encrypted before transmission to the specified destination address. As an example, after the voice data is translated, the header may be reinserted in the voice packet with the translated voice data.

Figure 5:
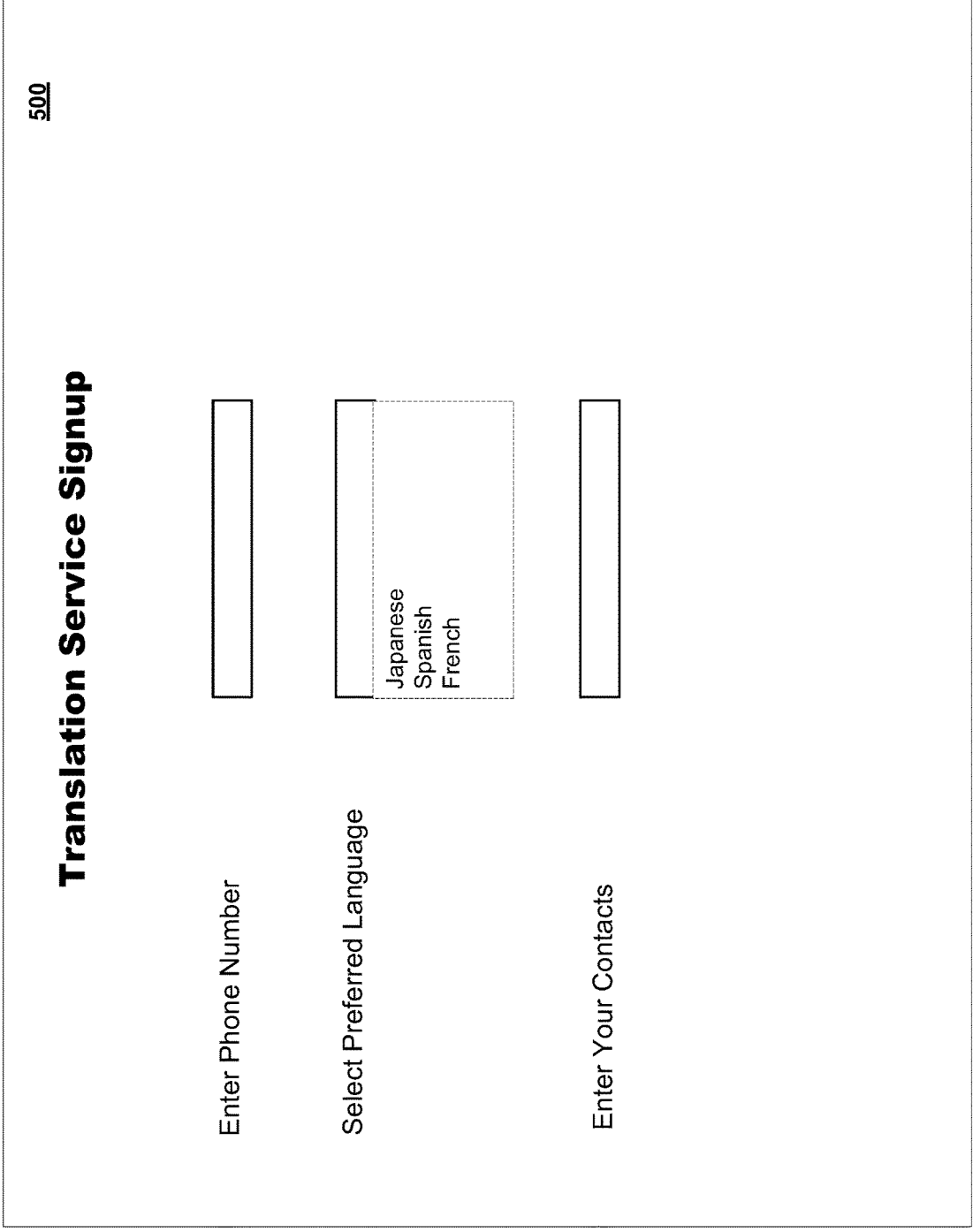
FIG. 5 illustrates an example subscriber interface, in accordance with various embodiments of the present disclosure.

FIG. 5 illustrates an example user interface (UI) 500 for subscribing for the translation service. The UI 500 may be provided by the subscriber engine 306 to a UE of a customer. The UI 500 may allow the subscriber to enter the subscriber's phone number, which may be used as the subscriber's identity. The UI 500 may further allow the subscriber to select a preferred language, which may be used for translation. For example, if the subscriber selects the preferred language as English, and a speaker on another side of the voice call is speaking Spanish, the voice data in Spanish may be translated to English. The UI 500 may further allow the subscriber to enter the subscriber's contacts (e.g., phone numbers). For example, if a voice call involves one of the subscriber's contacts, the translation service may be automatically activated. That is, the translation service may be activated based on the subscriber's contact information (e.g., phone number) instead of an explicit command provided by the subscriber.

Figure 6:
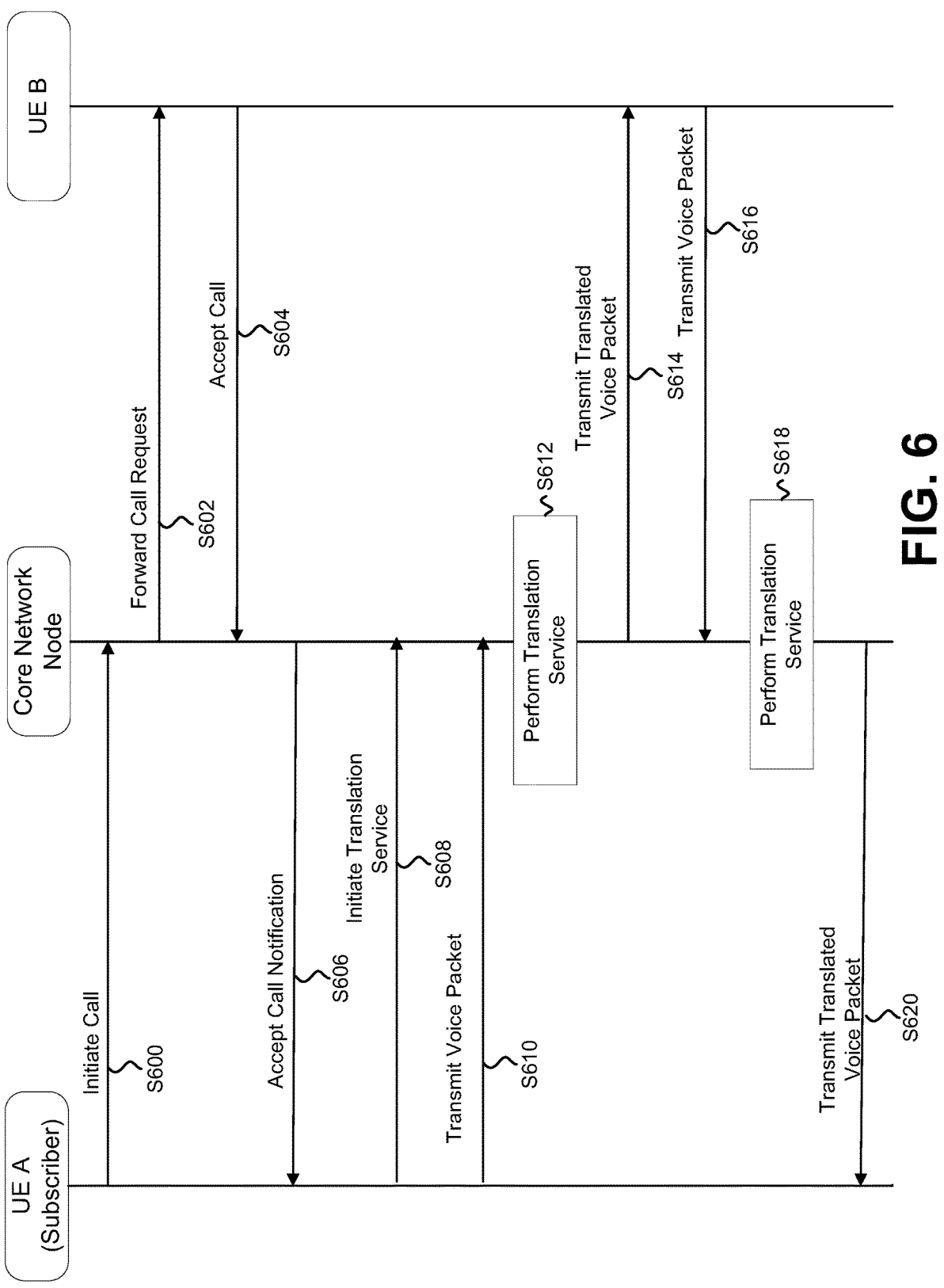
FIG. 6 is a sequence diagram of an example voice call that utilizes a translation service at the core network node.

FIG. 6 illustrates an example sequence diagram in which UE A initiates a call with UE B. As illustrated in FIG. 6, UE A is the subscriber of the translation service. The process may start at step S600 where UE A initiates a call with UE B. The core network node may forward the call request at step S602 to UE B. At step S604, the UE B may accept the call, where the core network node notifies UE A of the accepted call at step S606. After the call is accepted, UE A may initiate the translation service at step S608. For example, the user of UE A may say "Start Translation Service" to initiate the translation service. As another example, the translation service may be initiated based on the number dialed by the user of UE A to initiate the call at step S600. For example, the user may have a predetermined list of numbers or contacts, where if a call is initiated with or received from a number or contact on this list, the translation services is automatically initiated.

At step S610, a voice data packet is transmitted to the core network node. For example, when the user of UE A starts speaking, the voice data packet may be transmitted to the core network node. At step S612, the core network node performs the translation service on the voice data packet. If the user of UE B is also a subscriber of the translation service, the voice data packet may be translated to a preferred language specified by the user of UE B. If the user of UE B is not a subscriber of the translation service, the voice data packet may be translated to a language based on a command provided by the user of UE A, or based on a language detected by any prior voice data packets received at the core network node from UE B.

At step S614, the translated voice data packet is forwarded to UE B. At step S616, UE B transmits a voice data packet to the core network node, where the core network node performs the translation service at step S618. At step S620, the core network node transmits the translated voice data packet to UE A.

Figure 7:
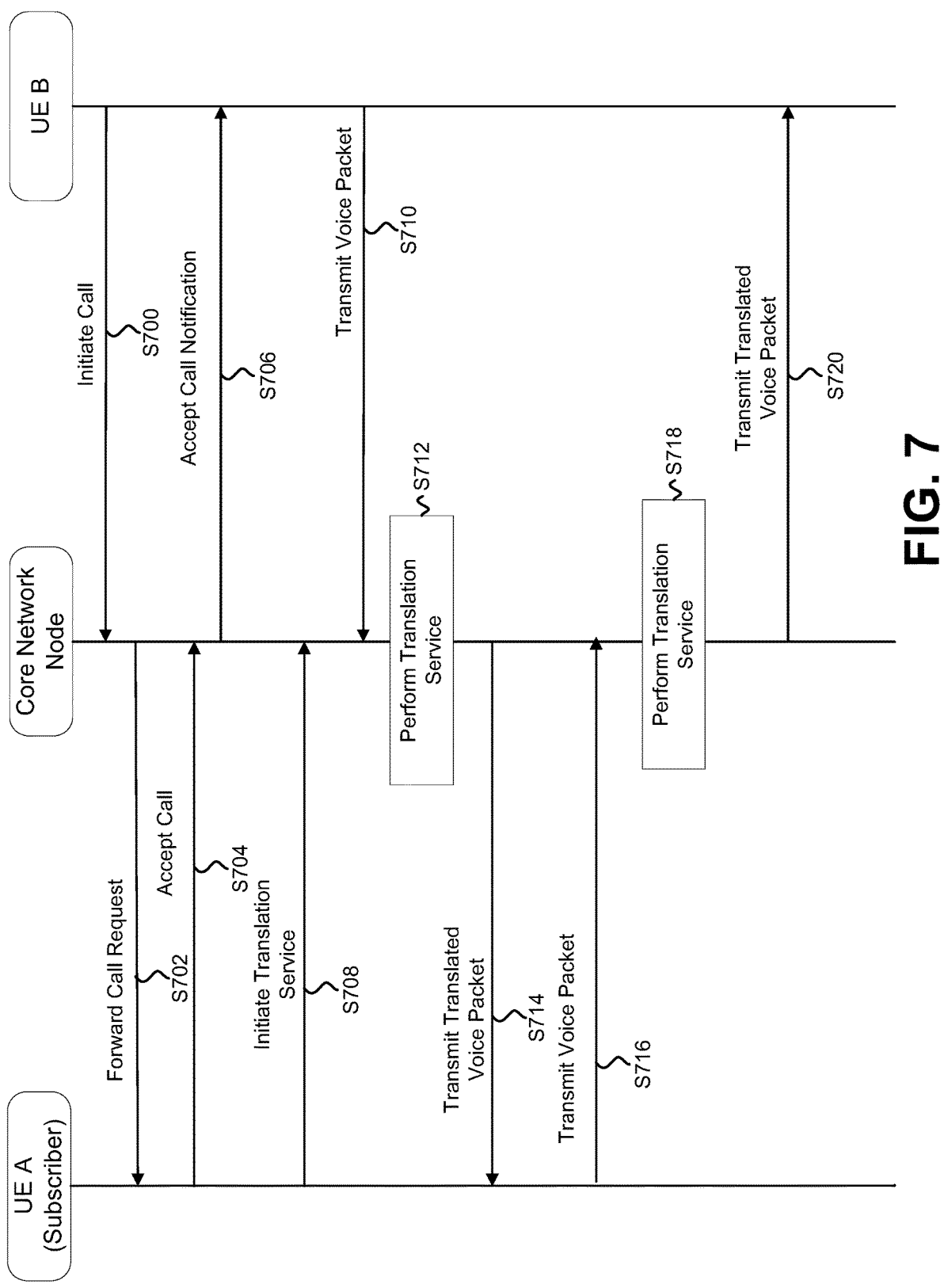
FIG. 7 is a sequence diagram of an example voice call that utilizes a translation service at the core network node.

FIG. 7 illustrates another example of a sequence diagram in which UE B initiates a call with UE A at step S700. The core network node forwards the call request to UE A at step S702, where the UE A indicates the call is accepted at step S704, and the core network node forwards the accept call notification at step S706.

At step S708, UE A initiates the translation service via a voice command as discussed above. Alternatively, the translation service may be automatically initiated based on the number of the incoming call. At step S710, UE B transmits a voice data packet, and at step S712, the core network node performs a translation service S712 based on a preferred languages set by the user of UE A. The core network node transmits the translated voice data packet at step S714. At step S716, UE A transmits a voice data packet where the core network node performs the translation service at step S718. For example, the translation service S718 may be performed based on a language detected from the voice data packet from UE B at step S712. At step S720, the core network node transmits the translated voice data packet to UE B.

Figure 8:
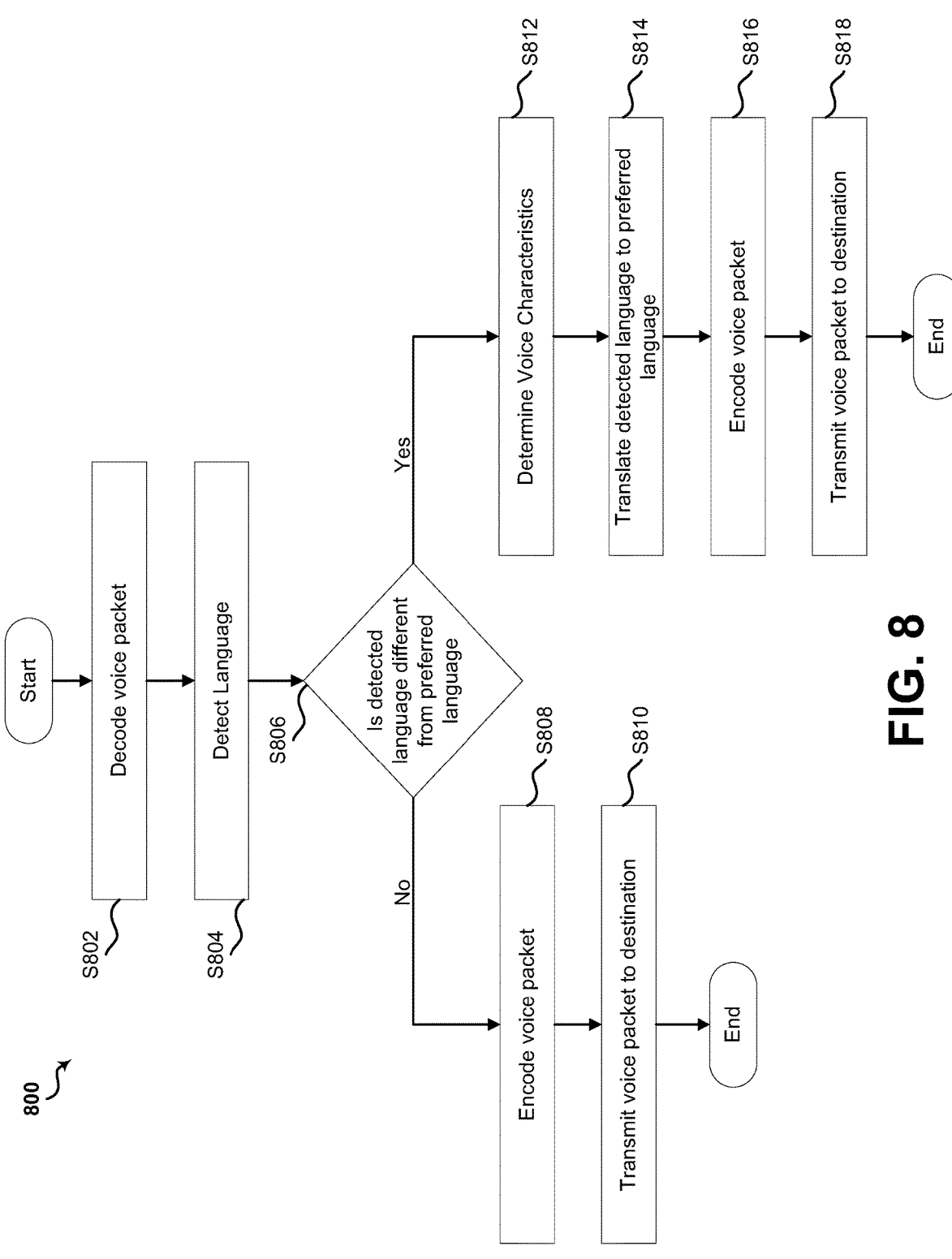
FIG. 8 is a flow chart of an example process for translating a voice data packet.

FIG. 8 illustrates an embodiment of a translation process 800 performed at a core network node such as core network node 240. In some embodiments, the process illustrated in FIG. 8 is started when the translation service is initiated and the core network node receives a voice data packet for a subscriber or receives a voice data packet from the subscriber. The process illustrated in FIG. 8 may start at step S802 where the core network node decodes the voice data packet. For example, if the voice data packet is encrypted, the voice data packet is decrypted, and the voice data is extracted from the voice data packet.

The process proceeds to step S804 where a language from the voice data packet is detected. The process proceeds to step S806 where it is determined if the detected language is different from the preferred language. If the detected language is the same as the preferred language, the process proceeds to step S808. If the detected language is different than the preferred language, the process proceed to step S812.

For example, if the subscriber specifies English as the preferred language, the detected language is English, no translation is needed and the process proceeds from step S806 to step S808 where the packet is encoded. For example, the voice data may be reinserted in the voice data packet, where the packet is subsequently encrypted. The process proceeds to step S810 where the voice data packet is transmitted to the destination.

If the subscriber specified English as the preferred language, and the detected language is Spanish, translation is required and the process proceeds from step S806 to step S812 where voice characteristics are determined. The process proceeds to step S814 where the detected language is translated to the preferred language. As an example, the voice data may be translated from Spanish to English using the determined voice characteristics so that the translated voice data corresponds to the voice of the Spanish speaker. The process proceeds to step S816 where the voice data packet is encoded. For example, the translated voice data is reinserted in the voice data packet, and subsequently encrypted. The process proceeds to step S818 where the voice data packet is transmitted to the destination. The process illustrated in FIG. 8 may be completed when either one of steps S810 or S818 are completed.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method performed in a processor of a network node, the method including: receiving at least one data packet associated with a voice call, the at least one data packet including (i) header information that specifies a source address and a destination address and (ii) voice data; in response to determining the at least one data packet is associated with a subscriber of a translation service performed in the network node, performing the translation service including: (i) detecting a first language of the voice data of the at least one data packet; (ii) translating the voice data to a second language specified by the subscriber in response to a determination the second language is different than the first language; and (iii) transmitting the at least one data packet with the translated voice data to the destination address.

(2) The method according to feature (1), in which the voice data of the received at least one data packet contains source speech, the translation service further includes detecting voice characteristics of the source speech of the voice data, and the translating the voice data to the second language is further based on the detected voice characteristics such that the translated voice data corresponds to the source speech of the voice data.

(3) The method according to feature (1) or (2), in which the at least one data packet is determined to be associated with the subscriber of the translation service in response to a determination the source address is associated with the subscriber.

(4) The method according to any one of features (1)-(3), in which the at least one data packet is determined to be associated with the subscriber of the translation service in response to a determination the destination address is associated with the subscriber.

(5) The method according to any one of features (1)-(4), in which the translation service is performed in further response to an initiation command provided by the subscriber.

(6) The method according to feature (5), in which the initiation command is a voice command provided by the subscriber.

(7) The method according to any one of features (1)-(6), in which the translation service is performed in further response to a determination the at least one data packet is associated with a phone number specified by the subscriber.

(8) The method according to any one of features (1)-(7), in which the translation service is performed and the at least one data packet is transmitted in accordance with a guaranteed bit rate service associated with the voice call.

(9) The method according to any one of features (1)-(8), in which the at least one data packet is encrypted in accordance with a security protocol associated with the voice call.

(10) The method according to any one of features (1)-(9), in which the translation service is included with a roaming network service provided to the subscriber.

(11) The method according to any one of features (1)-(10), further including transmitting the at least one data packet with the translated voice data to a voicemail inbox associated with the subscriber in response to a determination the voice call is not connected.

(12) The method according to any one of features (1)-(11), in which the network node is a core network node that receives the at least one data packet from a base station.

(13) A network node, including: at least one memory configured to store computer program code; and at least one processor configured to access said at least one memory and operate as instructed by the computer program code, the computer program code including: receiving code configured to cause at least one of said at least one processor to receive at least one data packet associated with a voice call, the at least one data packet including (i) header information that specifies a source address and a destination address and (ii) voice data; performing code configured to cause at least one of said at least one processor to, in response to determining the at least one data packet is associated with a subscriber of a translation service performed in the network node, perform the translation service including: (i) detecting a first language of the voice data of the at least one data packet; (ii) translating the voice data to a second language specified by the subscriber in response to a determination the second language is different than the first language; and (iii) transmitting the at least one data packet with the translated voice data to the destination address.

(14) The network node according to feature (13), in which the voice data of the received at least one data packet contains source speech, the translation service further includes detecting voice characteristics of the source speech of the voice data, and the translating the voice data to the second language is further based on the detected voice characteristics such that the translated voice data corresponds to the source speech of the voice data.

(15) The network node according to feature (13) or (14), in which the at least one data packet is determined to be associated with the subscriber of the translation service in response to a determination the source address is associated with the subscriber.

(16) The network node according to any one of features (13)-(15), in which the at least one data packet is determined to be associated with the subscriber of the translation service in response to a determination the destination address is associated with the subscriber.

(17) The network node according to any one of features (13)-(16), in which the translation service is performed in further response to an initiation command provided by the subscriber.

(18) The network node according to feature (17), in which the initiation command is a voice command provided by the subscriber.

(19) The network node according to any one of features (13)-(18), in which the translation service is performed in further response to a determination the at least one data packet is associated with a phone number specified by the subscriber.

(20) A non-transitory computer readable medium having instructions stored therein, which when executed by a processor in a network node cause the processor to execute a method including: receiving at least one data packet associated with a voice call, the at least one data packet including (i) header information that specifies a source address and a destination address and (ii) voice data; in response to determining the at least one data packet is associated with a subscriber of a translation service performed in the network node, performing the translation service including: (i) detecting a first language of the voice data of the at least one data packet; (ii) translating the voice data to a second language specified by the subscriber in response to a determination the second language is different than the first language; and (iii) transmitting the at least one data packet with the translated voice data to the destination address.

What is claimed is:

1. A method performed in a processor of a network node, the method comprising:

receiving, by the network node of a telecommunications network, at least one data packet associated with a voice call, the at least one data packet including (i) header information that specifies a source address and a destination address and (ii) voice data;

in response to determining the at least one data packet is associated with a subscriber of a translation service performed in the network node, performing the translation service including:

(i) detecting, by the network node, a first language of the voice data of the at least one data packet, the network node analyzing the voice data included in the at least one data packet in order to automatically detect the first language;

(ii) translating, by the network node, the voice data to a second language specified by the subscriber in response to a determination the second language is different than the first language; and (iii) transmitting, by the network node, the at least one data packet with the translated voice data to the destination address, wherein the voice data of the received at least one data packet contains source speech, the translation service further includes detecting voice characteristics of the source speech of the voice data, and the translating the voice data to the second language is further based on the detected voice characteristics such that the translated voice data sounds as if spoken by a speaker of the source speech of the voice data.

2. The method according to claim 1, wherein the at least one data packet is determined to be associated with the subscriber of the translation service in response to a determination the source address is associated with the subscriber.

3. The method according to claim 1, wherein the at least one data packet is determined to be associated with the subscriber of the translation service in response to a determination the destination address is associated with the subscriber.

4. The method according to claim 1, wherein the translation service is performed in further response to an initiation command provided by the subscriber.

5. The method according to claim 4, wherein the initiation command is a voice command provided by the subscriber.

6. The method according to claim 1, wherein the translation service is performed in further response to a determination the at least one data packet is associated with a phone number specified by the subscriber.

7. The method according to claim 1, wherein the translation service is performed and the at least one data packet is transmitted in accordance with a guaranteed bit rate service associated with the voice call.

8. The method according to claim 1, wherein the at least one data packet is encrypted in accordance with a security protocol associated with the voice call.

9. The method according to claim 1, wherein the translation service is included with a roaming network service provided to the subscriber.

10. The method according to claim 1, further comprising transmitting the at least one data packet with the translated voice data to a voicemail inbox associated with the subscriber in response to a determination the voice call is not connected.

11. The method according to claim 1, wherein the network node is a core network node that receives the at least one data packet from a base station.

12. A network node, comprising:

at least one memory configured to store computer program code; and at least one processor configured to access said at least one memory and operate as instructed by the computer program code, the computer program code including:

receiving code configured to cause at least one of said at least one processor to receive at least one data packet associated with a voice call, the at least one data packet including (i) header information that specifies a source address and a destination address and (ii) voice data;

performing code configured to cause at least one of said at least one processor to, in response to determining the at least one data packet is associated with a subscriber of a translation service performed in the network node, perform the translation service including:

(i) detecting a first language of the voice data of the at least one data packet, by analyzing the voice data included in the at least one data packet in order to automatically detect the first language;

(ii) translating the voice data to a second language specified by the subscriber in response to a determination the second language is different than the first language; and (iii) transmitting the at least one data packet with the translated voice data to the destination address, wherein the voice data of the received at least one data packet contains source speech, the translation service further includes detecting voice characteristics of the source speech of the voice data, and the translating the voice data to the second language is further based on the detected voice characteristics such that the translated voice data sounds as if spoken by a speaker of the source speech of the voice data.

13. The network node according to claim 12, wherein the at least one data packet is determined to be associated with the subscriber of the translation service in response to a determination the source address is associated with the subscriber.

14. The network node according to claim 12, wherein the at least one data packet is determined to be associated with the subscriber of the translation service in response to a determination the destination address is associated with the subscriber.

15. The network node according to claim 12, wherein the translation service is performed in further response to an initiation command provided by the subscriber.

16. The network node according to claim 15, wherein the initiation command is a voice command provided by the subscriber.

17. The network node according to claim 12, wherein the translation service is performed in further response to a determination the at least one data packet is associated with a phone number specified by the subscriber.

18. A non-transitory computer readable medium having instructions stored therein, which when executed by a processor in a network node cause the processor to execute a method comprising:

receiving, by the network node of a telecommunications network, at least one data packet associated with a voice call, the at least one data packet including (i) header information that specifies a source address and a destination address and (ii) voice data;

in response to determining the at least one data packet is associated with a subscriber of a translation service performed in the network node, performing the translation service including:

(i) detecting, by the network node, a first language of the voice data of the at least one data packet, the network node analyzing the voice data included in the at least one data packet in order to automatically detect the first language;

(ii) translating, by the network node, the voice data to a second language specified by the subscriber in response to a determination the second language is different than the first language; and (iii) transmitting, by the network node, the at least one data packet with the translated voice data to the destination address, wherein the voice data of the received at least one data packet contains source speech, the translation service further includes detecting voice characteristics of the source speech of the voice data, and the translating the voice data to the second language is further based on the detected voice characteristics such that the translated voice data sounds as if spoken by a speaker of the source speech of the voice data.

* * * * *